(12) United States Patent
Jangda et al.

(10) Patent No.: US 10,573,265 B2
(45) Date of Patent: Feb. 25, 2020

(54) NOISE CANCELLATION

(71) Applicant: Apple Inc., Cupertino, CA (US)

(72) Inventors: Mohammad Ali Jangda, Cupertino, CA (US); Marc Joseph DeVincentis, Palo Alto, CA (US); Abbas Jamshidi-Roudbari, San Jose, CA (US); Warren S. Rieutort-Louis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 16/110,920

(22) Filed: Aug. 23, 2018

(65) Prior Publication Data

US 2018/0366081 A1 Dec. 20, 2018

Related U.S. Application Data

(63) Continuation-in-part of application No. 15/711,738, filed on Sep. 21, 2017.

(60) Provisional application No. 62/501,571, filed on May 4, 2017.

(51) Int. Cl.
*G06F 3/041* (2006.01)
*G09G 3/36* (2006.01)
*G06F 3/044* (2006.01)

(52) U.S. Cl.
CPC ......... *G09G 3/3655* (2013.01); *G06F 3/0412* (2013.01); *G06F 3/0418* (2013.01); *G06F 3/044* (2013.01); *G09G 2300/043* (2013.01); *G09G 2300/0819* (2013.01); *G09G 2320/0209* (2013.01); *G09G 2330/06* (2013.01)

(58) Field of Classification Search
CPC .......... G09G 3/3655; G09G 2300/043; G09G 2320/0209; G09G 2320/0219; G09G 2320/0247; G09G 2330/06; G06F 3/041; G06F 3/0412; G06F 3/0418; G06F 3/04182; H04N 5/213; H04N 5/357
See application file for complete search history.

(56) References Cited

U.S. PATENT DOCUMENTS

| 4,040,090 | A | * | 8/1977 | Haynes | H04N 5/21 |
| | | | | | 348/533 |
| 6,444,970 | B1 | * | 9/2002 | Barbato | A61B 5/0075 |
| | | | | | 250/214 A |
| 7,183,859 | B2 | * | 2/2007 | Visocchi | H03F 1/30 |
| | | | | | 250/214 A |
| 7,508,497 | B2 | * | 3/2009 | LaBelle | G01C 3/08 |
| | | | | | 356/5.01 |
| 9,349,317 | B2 | * | 5/2016 | Kim | G09G 3/3233 |
| 2006/0050027 | A1 | * | 3/2006 | Meguro | G09G 3/006 |
| | | | | | 345/75.2 |
| 2008/0122760 | A1 | * | 5/2008 | Levey | G09G 3/3233 |
| | | | | | 345/78 |
| 2009/0213049 | A1 | * | 8/2009 | McCreary | G09G 3/3233 |
| | | | | | 345/80 |

(Continued)

*Primary Examiner* — Joe H Cheng
(74) *Attorney, Agent, or Firm* — Fletcher Yoder PC

(57) ABSTRACT

Electronic devices, storage medium containing instructions, and methods pertain to cancelling noise that results from application of clocks/clock drivers of a display. The electronic display may inject counter noise into the cathode. For example, the counter noise may be injected via a sensing layer, via unused clocks, and/or via a power rail of the display.

20 Claims, 18 Drawing Sheets

(56) References Cited

U.S. PATENT DOCUMENTS

| | | | | |
|---|---|---|---|---|
| 2011/0130981 A1* | 6/2011 | Chaji | ............... | G09G 3/006 |
| | | | | 702/58 |
| 2011/0279444 A1* | 11/2011 | Chung | ............. | G09G 3/3233 |
| | | | | 345/214 |
| 2012/0242412 A1* | 9/2012 | Fletcher-Haynes | ....... | H03F 1/30 |
| | | | | 330/296 |
| 2014/0152642 A1* | 6/2014 | Kim | ............... | G09G 3/3233 |
| | | | | 345/212 |
| 2015/0130690 A1* | 5/2015 | Kim | ............... | G09G 3/3233 |
| | | | | 345/78 |
| 2015/0130780 A1* | 5/2015 | Kwon | ............. | G09G 3/3233 |
| | | | | 345/212 |
| 2018/0137819 A1* | 5/2018 | An | ............... | G09G 3/3233 |

\* cited by examiner

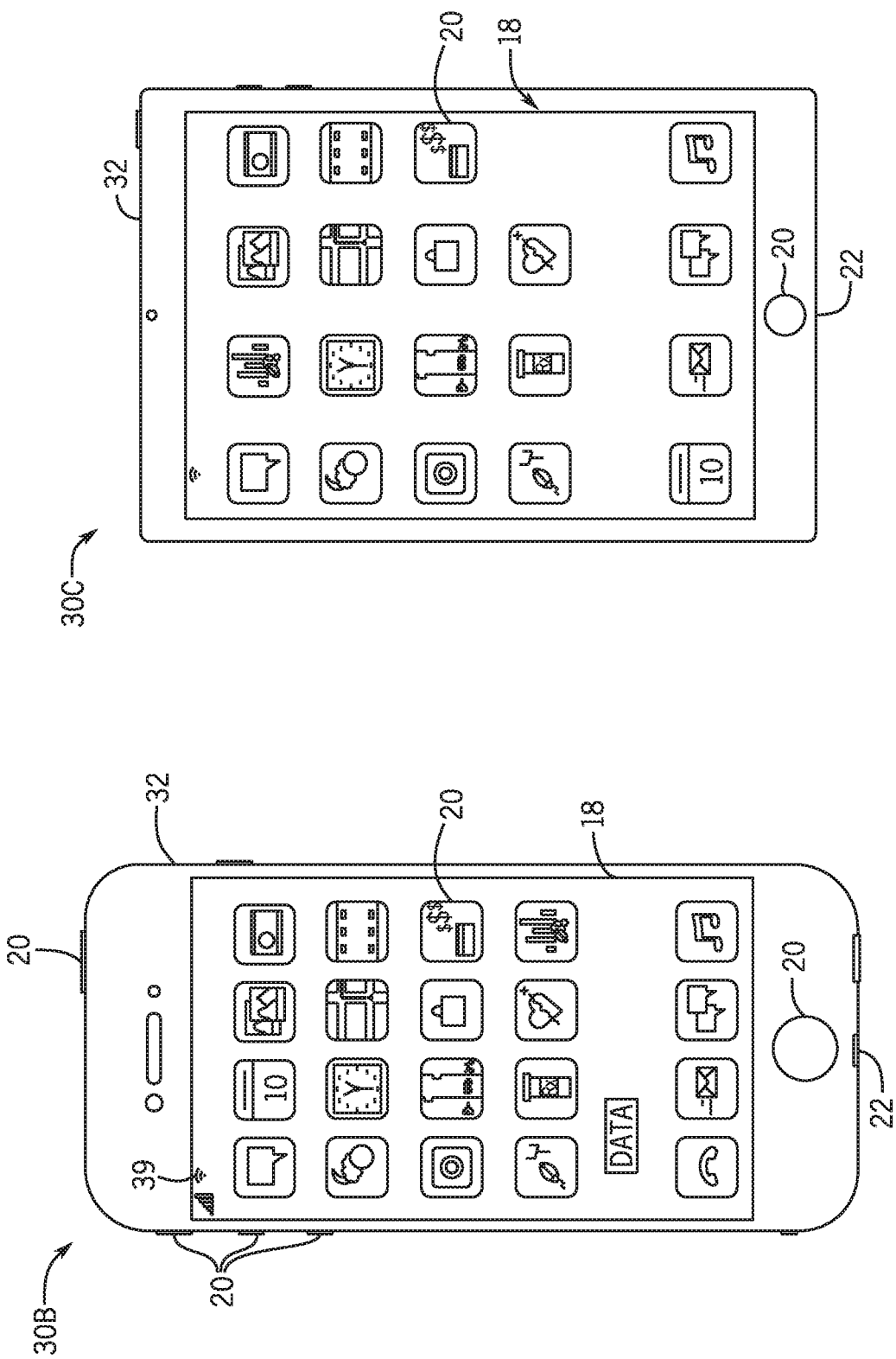

NOISE CANCELLATION
>
> ## CROSS REFERENCE TO RELATED APPLICATIONS
>
> This application is a continuation-in-part of U.S. application Ser. No. 15/711,738, filed on Sep. 21, 2017, now U.S. Pat. No. 10,375,278 B2, which claims the benefit of U.S. Provisional Application No. 62/501,571, filed on May 4, 2017, the contents of which are herein expressly incorporated by reference for all purposes.
>
> ## BACKGROUND
>
> The present disclosure relates generally to techniques to cancelling noise resultant from operations in a display. More specifically, the present disclosure relates generally to techniques for noise cancellation resulting from a gate driver clock and its interference with an overlay touch panel.
>
> This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.
>
> Electronic display panels are used in a plethora of electronic devices. These display panels typically consist of multiple pixels that emit light. These pixels may be formed using self-emissive units (e.g., light emitting diode) or pixels that utilize units that are backlit (e.g., liquid crystal diode). These pixels are usually controlled using transistors (e.g., thin film transistors) that utilize a driving threshold voltage to determine at which level the pixels are to be driven. These displays may also include touch functionality that may be interfered with by operation of the display. Specifically, noise from a gate driver clock of the gates of the pixels and/or noise from data-lines may pull a voltage of a touch sensing layer up or down in the direction of the clock voltage fluctuation due to capacitive coupling with a substrate on which pixel circuitry is mounted. This voltage fluctuation may result in false positive touches and/or may result in touches occurring without being sensed by the display.
>
> ## SUMMARY
>
> A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.
>
> In some embodiments, a gate driver clock may be used to cancel out the voltage fluctuations of the touch layer. As previously noted, these fluctuations may be caused by a gate driver clock driving pixels connected to a substrate. A gate driver clock may be driven at an inverse voltage simultaneously with any connected gate driver clock to reduce the effect of the fluctuation on the touch levels. Moreover, this gate driver clock may be a dummy gate driver clock that is merely connected to the substrate without passing a voltage to any gate for usage. Additionally, in some embodiments, each operating gate driver clock may be at least partially cancelled using a respective dedicated gate driver clock, but in other embodiments, a cancelling gate driver clock may at least partially cancel out one or more other gate driver clock fluctuations.
>
> In some embodiments, the noise due to gate switching may be predicted and may be compensated for by inversely modifying a voltage (e.g., ELVSS) supplied to a cathode layer of the display. Additionally or alternative, some clocks of the display (e.g., non-emission clocks that do not control emission of the display) may be turned off during a portion of a scan. In some embodiments, instead of turning off the clocks, the clocks may apply an inversion of emission clocks to compensate for noise introduced by gate switching for the emission clocks.
>
> In some embodiments, one or more traces in a sensing layer may be used to inject inverse signals to compensate for switching of emission and/or non-emission clocks of the display.
>
> ## BRIEF DESCRIPTION OF THE DRAWINGS
>
> Various aspects of this disclosure may be better understood upon reading the following detailed description and upon reference to the drawings in which:
>
> FIG. 1 is a schematic block diagram of an electronic device including a display, in accordance with an embodiment;
>
> FIG. 2 is a perspective view of a notebook computer representing an embodiment of the electronic device of FIG. 1, in accordance with an embodiment;
>
> FIG. 3 is a front view of a hand-held device representing another embodiment of the electronic device of FIG. 1, in accordance with an embodiment;
>
> FIG. 4 is a front view of another hand-held device representing another embodiment of the electronic device of FIG. 1, in accordance with an embodiment;
>
> FIG. 5 is a front view of a desktop computer representing another embodiment of the electronic device of FIG. 1, in accordance with an embodiment;
>
> FIG. 6 is a front view of a wearable electronic device representing another embodiment of the electronic device of FIG. 1, in accordance with an embodiment;
>
> FIG. 7 is a schematic view of a unit pixel having a transistor and an illumination element, in accordance with an embodiment;
>
> FIG. 8 is a cross-sectional view of a portion of the display of FIG. 1, in accordance with an embodiment;
>
> FIG. 9 is a cross-sectional view of a capacitive coupling of a touch layer with a gate driver clocks, in accordance with an embodiment;
>
> FIG. 10 is a timing diagram illustrating noise effect on the touch layer due to the gate driver clocks of FIG. 10, in accordance with an embodiment;
>
> FIG. 11 is a flow diagram of a process for cancelling noise on a touch electrode of the display of FIG. 8, in accordance with an embodiment;
>
> FIG. 12 is a cross-sectional view of a portion of the display of FIG. 1, in accordance with an embodiment;
>
> FIG. 13 is a cross-sectional view of a capacitive coupling of a touch layer with a gate driver clocks, in accordance with an embodiment;
>
> FIG. 14 is a timing diagram illustrating noise effect on the touch layer due to the gate driver clocks of FIG. 13, in accordance with an embodiment;
>
> FIG. 15 is a cross-sectional view of a portion of the display of FIG. 1, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously discussed, cancelling gate driver clock(s) may be used to cancel out the voltage fluctuations of a touch layer. As previously noted, these fluctuations on the touch layer may be caused by a gate driver clock driving pixels connected to a substrate. A gate driver clock may be driven at an inverse voltage simultaneously with any connected gate driver clock to reduce the effect of the fluctuation on the touch levels. Moreover, this gate driver clock may be a dummy gate driver clock that is merely connected to the substrate without pass a voltage to any gate for usage. Additionally, in some embodiments, each operating gate driver clock may be at least partially cancelled using a respective dedicated gate driver clock, but in other embodiments, a cancelling gate driver clock may at least partially cancel out one or more other gate driver clock fluctuations.

Figure 1:
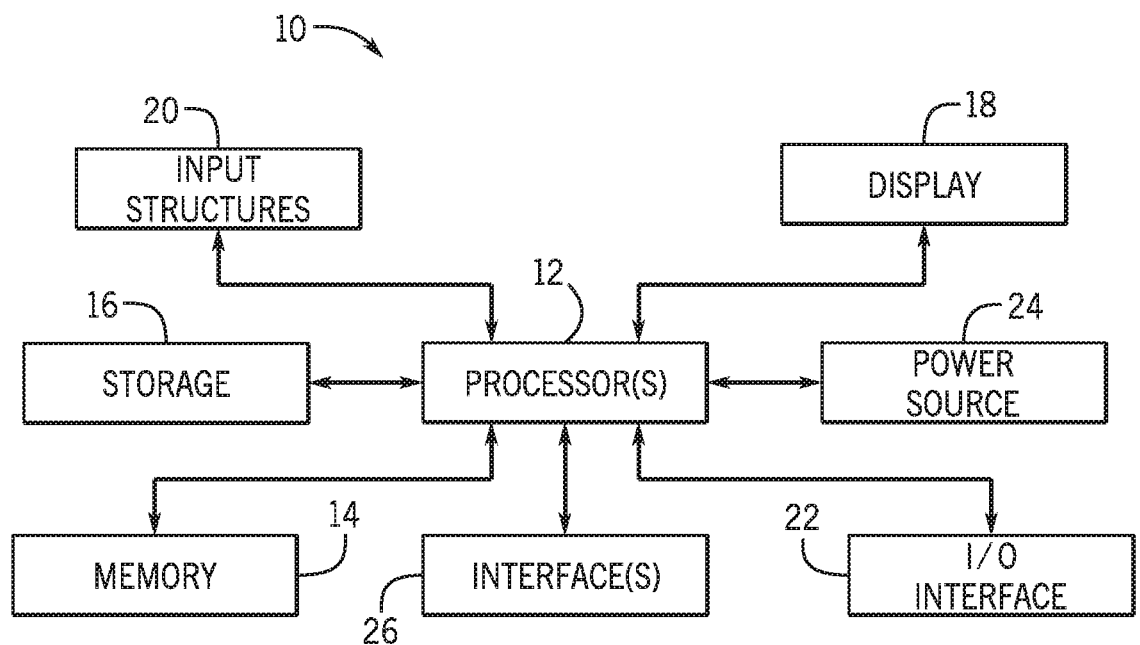

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level, a camera to record video or capture images). The I/O interface 22 may enable the electronic device 10 to interface with various other electronic devices. Additionally or alternatively, the I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include the power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11 Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth.

Figure 2:
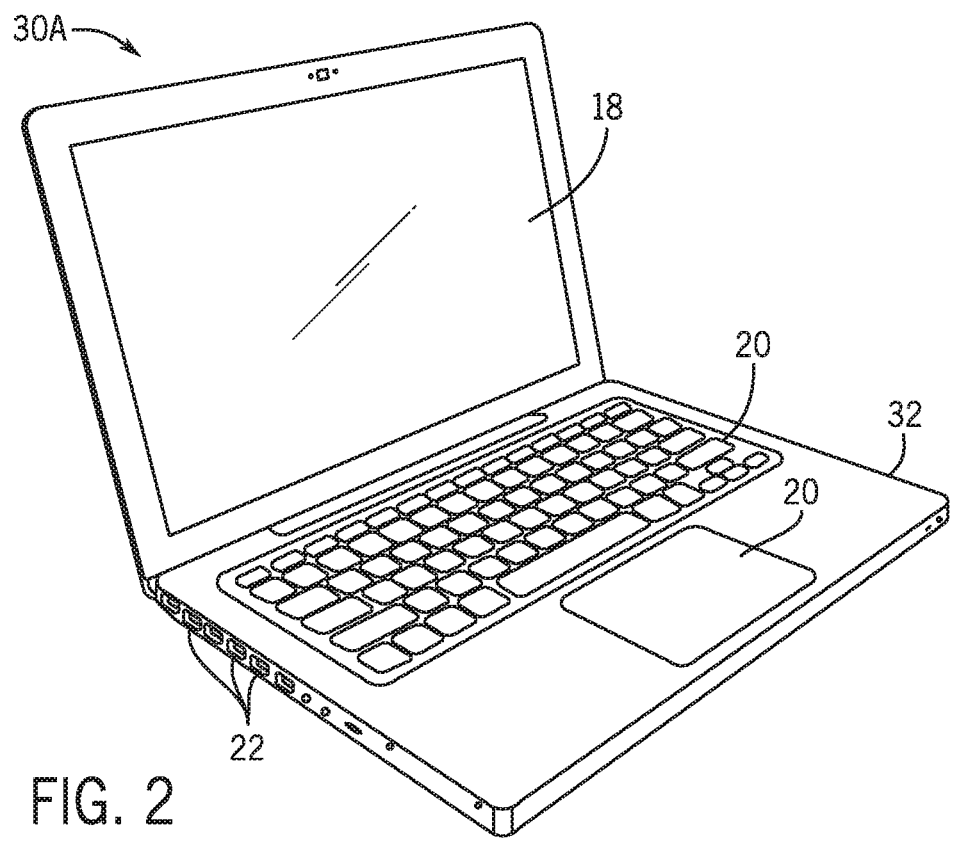
Figure 5:
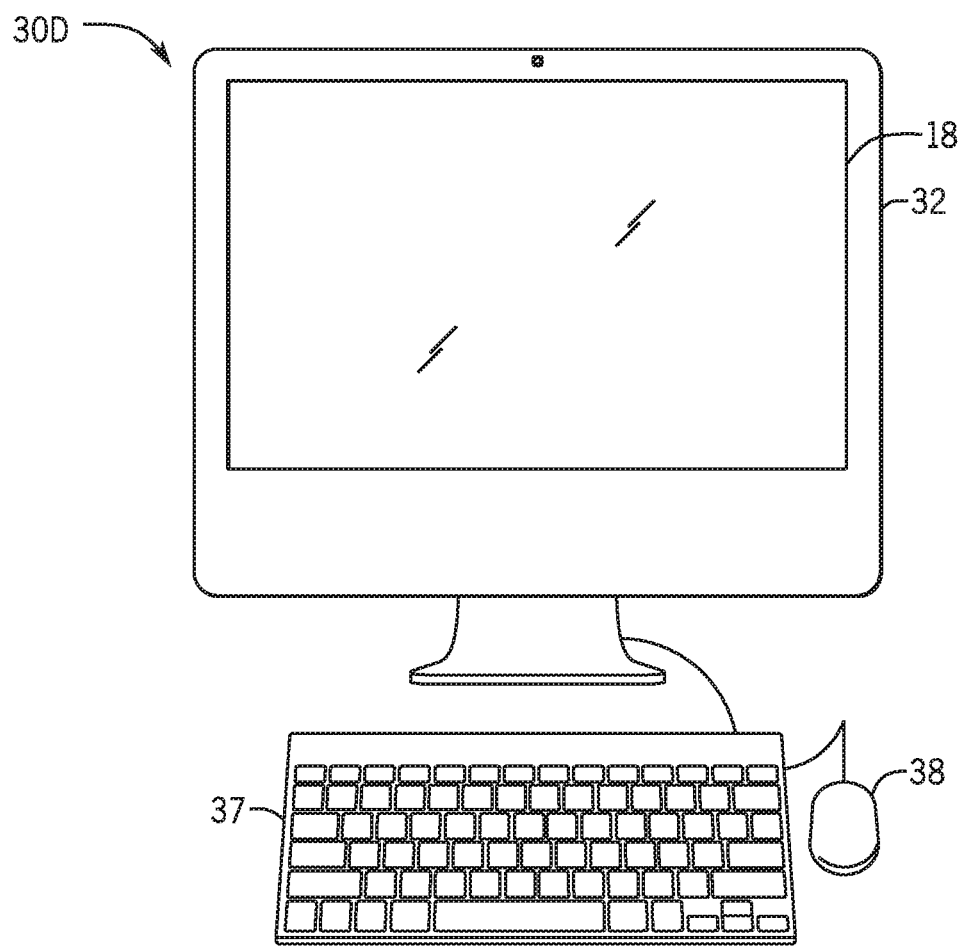
Figure 6:
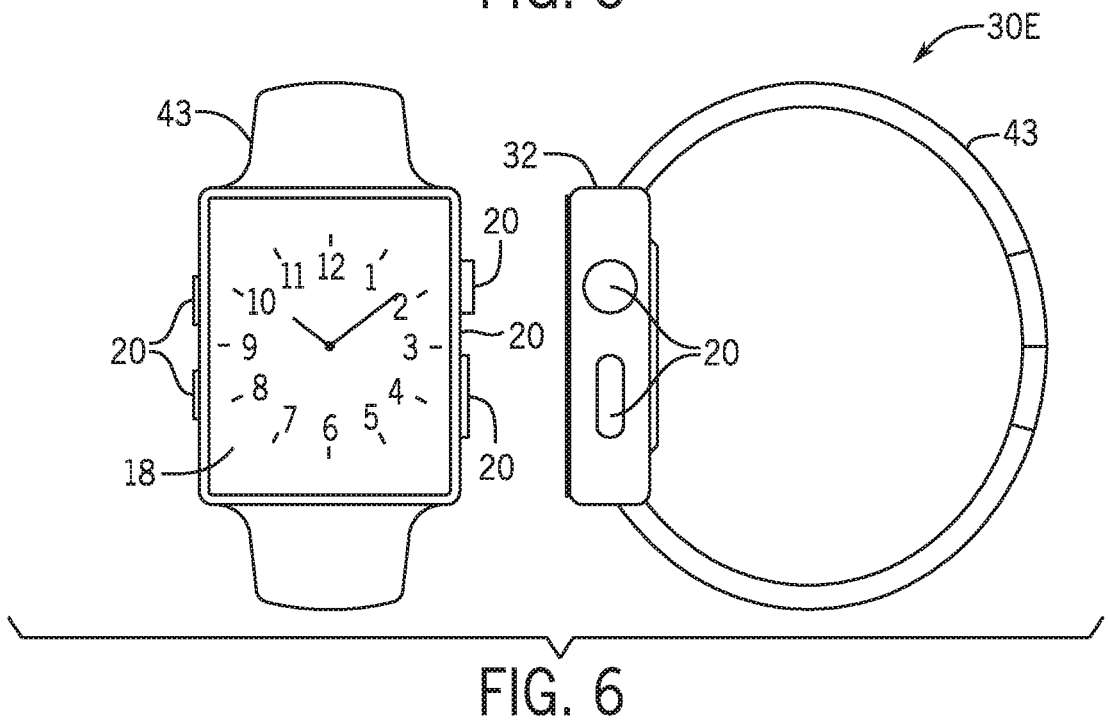

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons. The indicator icons may indicate, among other things, a cellular signal strength, Bluetooth connection, and/or battery life. The I/O interfaces 22 may open through the enclosure 32 and may include, for example, an I/O port for a hard-wired connection for charging and/or content manipulation using a connector and protocol, such as the Lightning connector provided by Apple Inc., a universal serial bus (e.g., USB), one or more conducted RF connectors, or other connectors and protocols.

The illustrated embodiments of the input structures 20, in combination with the display 18, may allow a user to control the handheld device 30B. For example, a first input structure 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone that may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices, such as the keyboard 37 or mouse 38, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display, an active-matrix organic light emitting diode (e.g., AMOLED) display, and so forth), which may allow users to interact with a user interface of the wearable electronic device 30E.

Figure 7:
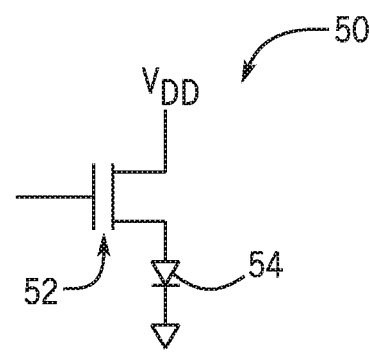

FIG. 7 illustrates a portion of unit pixel circuitry 50. The unit pixel circuitry 50 includes a control transistor 52 that controls emission levels of a light emitting diode (LED) 54. For example, the transistor 52 may include a thin film transistor (TFT). A gate of the transistor 52 may be driven using a gate driver clock. However, this gate driver clock may result in voltage fluctuations of a touch layer of the display.

Figure 8:
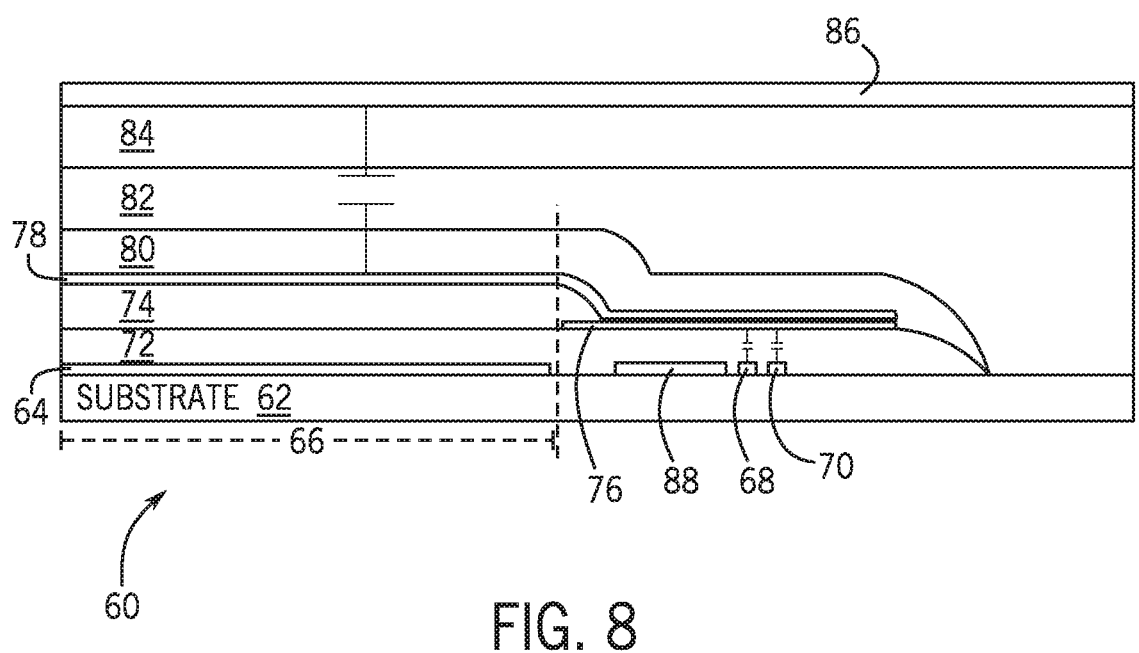

FIG. 8 illustrates a cross-sectional view of a portion 60 of the display 18. The portion 60 includes a substrate 62 upon which pixel circuitry 64 is mounted within an active area 66 of the display 18. For example, the pixel circuitry 64 may include thin-film transistors (TFTs). The pixel circuitry 64 is driven using two single-phase gate driver clocks 68 and 70 to drive gates in the active area and/or outside the active area. The portion 60 also includes one or more planarization layers 72 and 74 that are made of insulative material, such as a nitride or an oxide. An anode electrode 76 and a cathode electrode 78 (e.g., coupled to ELVSS) may be used to carry current in and out of the active area for display and/or touch functionality. The portion 60 may also include one or more insulative layers 80, 82, and 84 separating a touch layer/electrode 86 from a cathode electrode 88. The cathode electrode 88 may be directly connected (e.g., metal-to-metal) to the cathode electrode 78. In some embodiments, the touch layer/electrode 86 may be include one or more other sensing layers, with or without corresponding sensors, that sense parameters other than touch, such as force asserted on the display and the like. When the touch electrode 86 voltage fluctuates, a scan driver circuit detects such fluctuations and attributes touches exceeding a threshold to a touch of the display 18.

Figure 9:
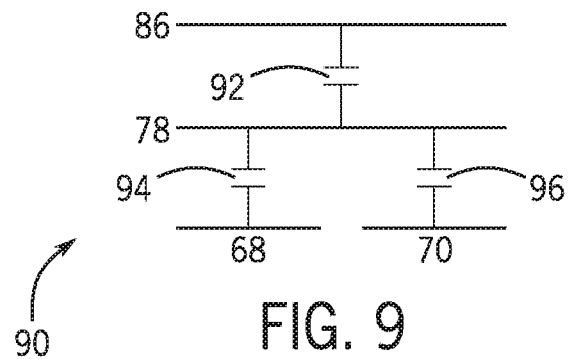

However, the voltage of the touch electrode 86 may fluctuate without a touch of the display. Instead, the voltage may fluctuate due to voltage changes at the cathode electrode 78 due to capacitive coupling between touch electrode 86 and the cathode electrode 78 through the insulative layers 80, 82, and 84. In some embodiments, the insulative layers 80, 82, and/or 84 may be omitted. However, the omission of the insulative layers 80, 82, and 84 may increase likelihood of capacitive coupling between the touch electrode 86 and the cathode electrode 78. Similarly, capacitive coupling may occur between the cathode electrode 78 and the substrate 62 though the planarization layer 72. FIG. 9 illustrates a schematic view of these capacitive couplings. As illustrated, a capacitive coupling 92 may occur between the touch electrode 86 and the cathode electrode 78. Similarly, capacitive coupling 94 may occur between the cathode electrode 78 and the substrate 62 at the gate driver clock 68, and another capacitive coupling 96 may occur between the cathode electrode 78 and the substrate 62 at the gate driver clock 70.

Figure 10:
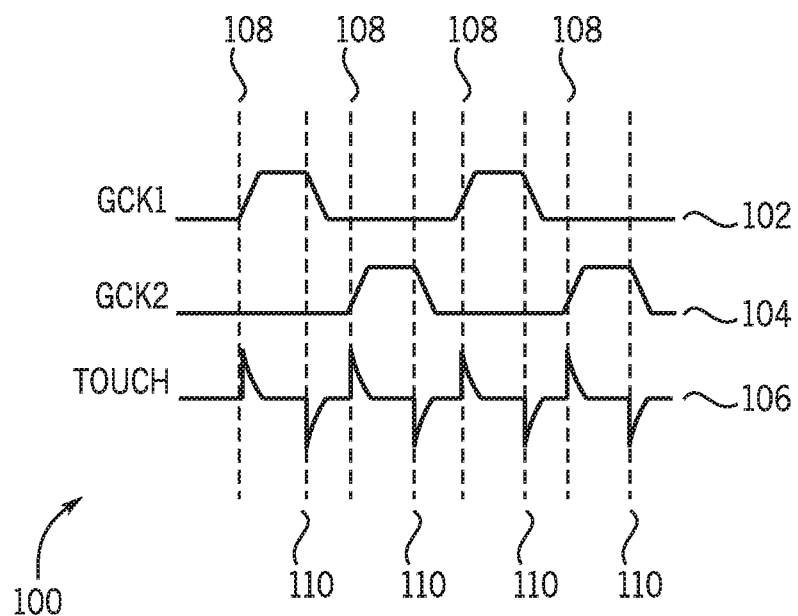

These couplings cause the voltage at the touch electrode 86 to vary when the gate driver clock 68 and/or the gate driver clock 70 fluctuate. FIG. 10 illustrates an embodiment of a timing diagram 100 illustrating this relationship. The timing diagram 100 illustrates a signal 102 indicative of the voltage at the gate driver clock 68 (GCK1) and a signal 104 indicative of the voltage at the gate driver clock 70 (GCK2). The timing diagram 100 also illustrates a signal 106 indicative of a touch electrode voltage. In the illustrated timing diagram 100, no actual touch has occurred. However, the signal 106 spikes upwardly with each rising edge 108 of GCK1 102 and GCK 2 104. If this spike exceeds a threshold for detecting a touch, this spike may register as a false positive. Moreover, the signal 106 also spikes downwardly with each falling edge 110 of the GCK1 102 and GCK2 104. If this downward spike occurs at the time of an actual touch, the touch may not register as a touch due to the downward spike pushing the signal 106 down below the threshold for touch sensing detection.

To address these voltage fluctuations, cancelling signals (e.g., from gate driver clocks) may be injected into the substrate at opposite polarity with similar amplitude and frequency to at least partially cancel the causes of the voltage fluctuations illustrated in FIG. 9.

Figure 11:
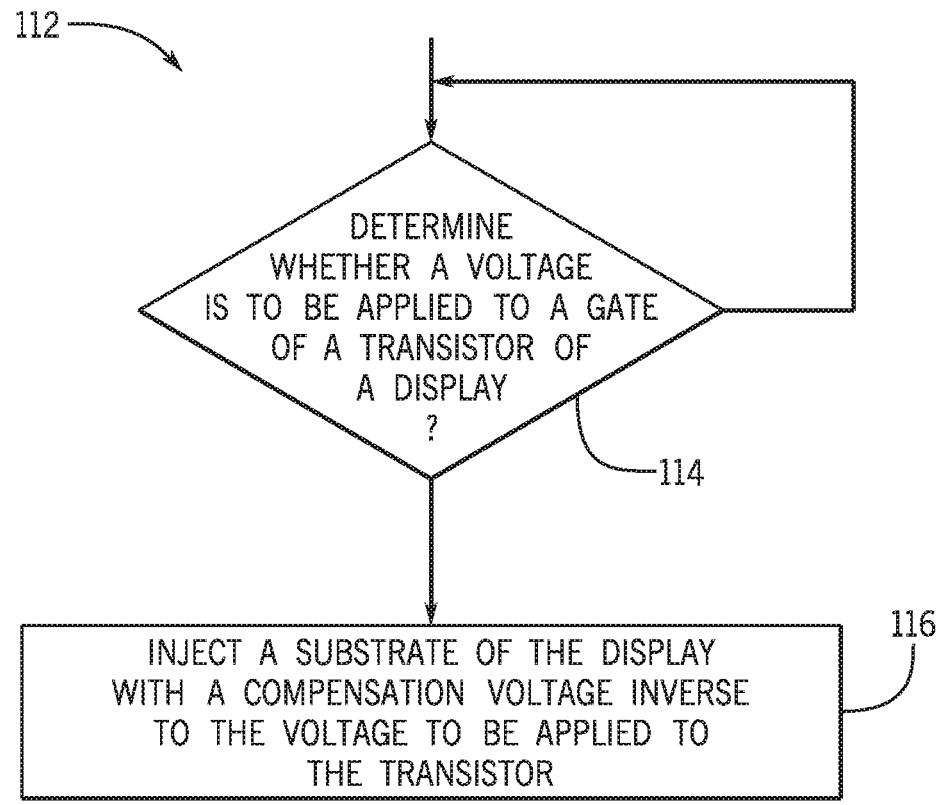

FIG. 11 illustrates a process 112 for at least partially cancelling noise in a display with touch sensing. For example, the display may be subject to data-line noise that is image dependent and/or gate-line (GIP) noise from scan clocks (GCK) used to generate writing on the display and/or emission clocks (EMGCK) that may be characteristic for the display regardless of an image being written. The processor 12 and/or timing circuitry in the display 18 determines that a voltage is to be applied to gates of transistors of the display (block 114). The processor 12 and/or the timing circuitry cause inverse signals to be generated and injected into the substrate to at least partially cancel voltage fluctuations that would be caused by the gate driver clock (block 116). These inverse signals may include signals that are not proactively used to control other circuitry. Instead, in such embodiments, these inverse signals may be a "dummy" or "compensation" gate driver clock that generates an inverted clock signal to cancel out such effects. Additionally or alternatively, these inverse clock signals may be used to switch other circuitry such as gates of adjacent pixels. These inverse signals may be used in a polarity switching timing scheme and/or to control gates in depletion mode.

Figure 12:
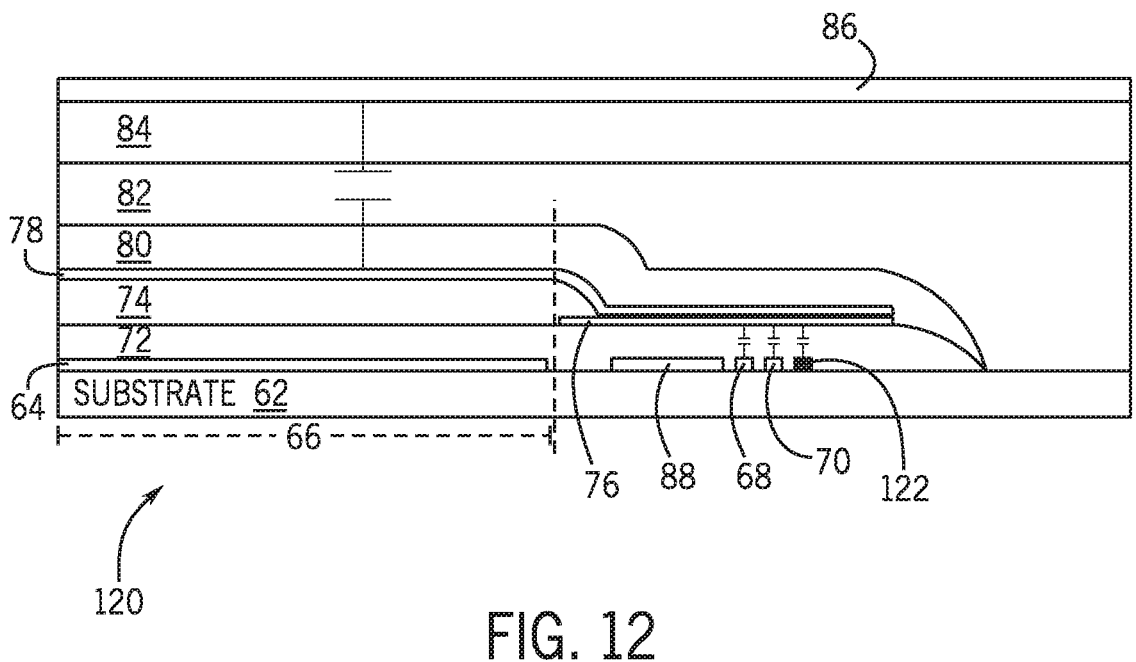
Figure 13:
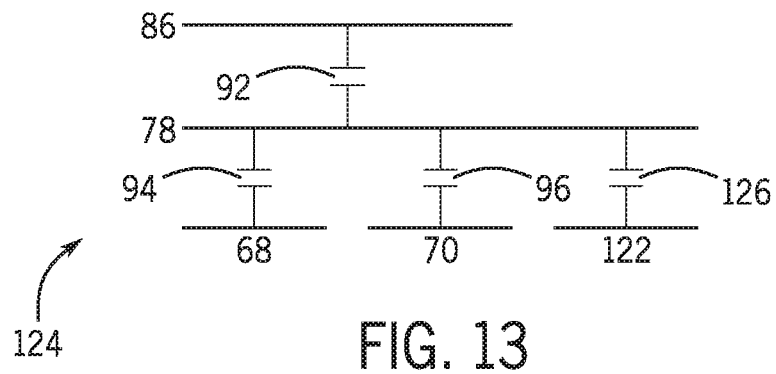

FIG. 12 illustrates a portion 120 of the display 18 that is similar to the portion 60. However, the portion 120 includes a single cancelling signal generator—cancelling gate driver clock 122—that injects an inverse signal of what is being injected in to the substrate 62 by the gate driver clocks 68 and 70. FIG. 13 illustrates the capacitive coupling 124 of the touch electrode 86, the cathode electrode 78, and the gate driver clocks 68, 70, and 122. Specifically, this coupling 124 is similar to the coupling 90 shown in FIG. 9 except that an additional coupling 126 exists in the coupling 124.

Figure 14:
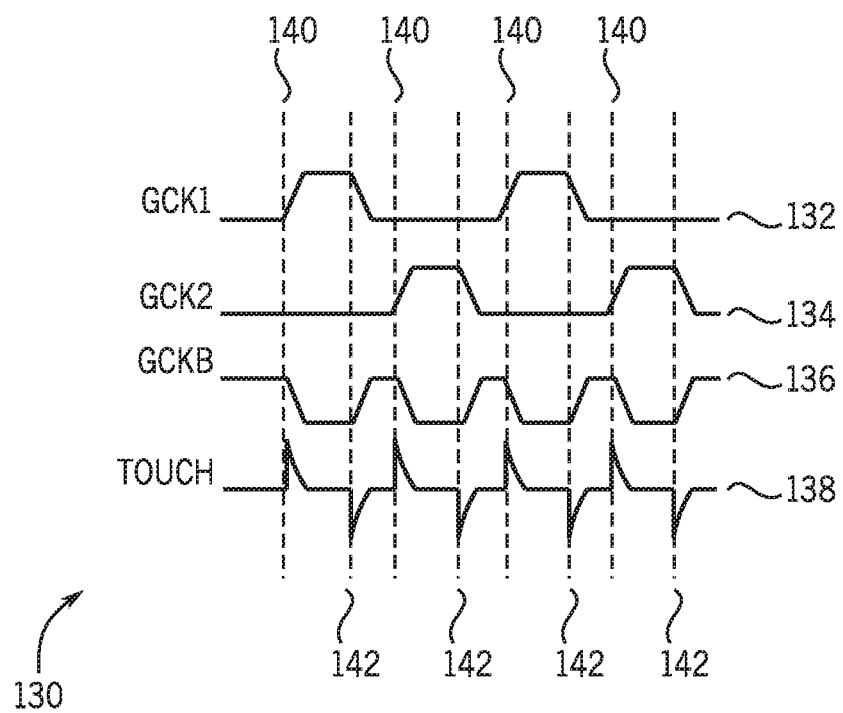

FIG. 14 illustrates an embodiment of a timing diagram 130 illustrating a relationship between the gate driver clocks and a touch electrode voltage utilizing voltage fluctuation compensation. The timing diagram 130 illustrates a signal 132 indicative of the voltage at the gate driver clock 68 (GCK1) and a signal 134 indicative of the voltage at the gate driver clock 70 (GCK2). The timing diagram 130 also illustrates a signal 136 indicative of the voltage at the dummy gate driver clock 122 (GCKB) and a signal 138 indicative of a touch electrode voltage. In some embodiments, the GCKB 122 signal may be generated by performing a logical AND on GCK1 signal 132 and GCK2 signal 134 and inverting (either before ANDing or after ANDing).

In the illustrated timing diagram 130, no actual touch has occurred, but the signal 138 increases upwardly with each rising edge 140 of the of GCK1 132 and GCK 2 134. However, this increase is relatively lower than the spike in the timing diagram 100 of FIG. 10 due to the inclusion of the voltage on the display via GCKB. Moreover, decreases in the signal 106 with each falling edge 142 of the GCK1 132 and GCK2 134 may also be relatively lower due to inverse application of voltages on the GCKB. In other words, the increase/decrease in voltage due to GCK1 132 and/or GCK2 134 switching may be partially or completely reduced. This reduced magnitude of fluctuation on the touch electrode may reduce the likelihood of a false positive of a touch event.

Figure 15:
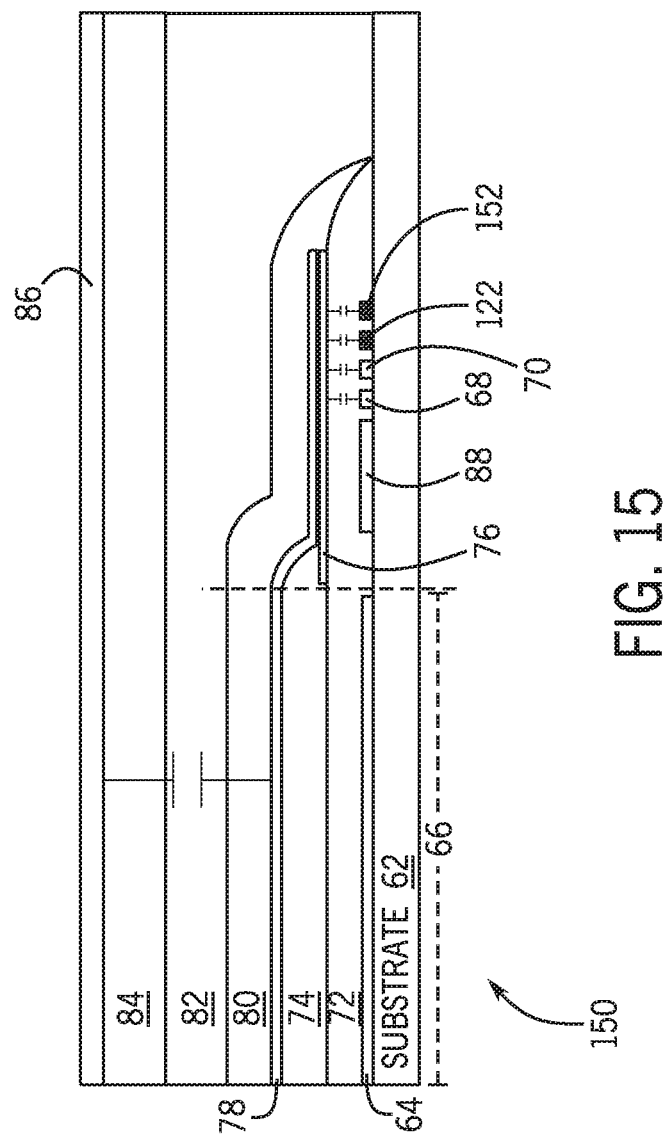

FIG. 15 illustrates a portion 150 of the display 18 that is similar to the portion 120. However, the portion 120 includes an additional cancelling signal generator—gate clock driver 152—in addition to the cancelling signal generator—gate clock driver 122—that injects an inverse signal of what is being injected in to the substrate 62 by the gate driver clocks 68 and 70. In the illustrated embodiment, a noise cancelling signal generator may be used for individual gate clocks. In other words, the cancelling signal generator may at least partially cancel noise arising from operation of the gate driver clock 68 while the additional cancelling signal generator at least partially cancels noise arising from operation of the gate driver clock 70. The timing of each cancelling gate drivers 122 and 152 may be a simple inversion of a corresponding gate driver clock. However, inclusion of additional gate drivers (e.g., cancelling signal generator) may increase a size of compensation circuitry in the display causing the display size to potentially increase without increasing viewable space and/or increasing complication of routing in the display. Some embodiments may use a combination of dedicated signal cancellation and individual cancellation by using more than a single noise cancellation driver, but using at least one of those noise cancellation circuitries to at least partially cancel noise arising from more than one single gate driver clock.

Figure 16:
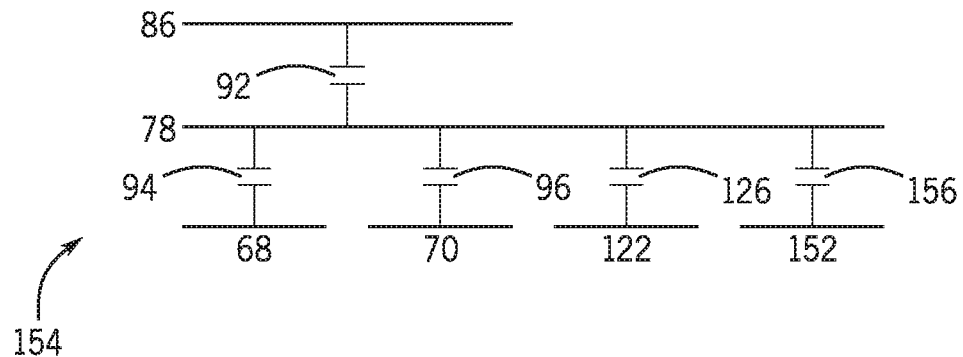
FIG. 16 is a cross-sectional view of a capacitive coupling of a touch layer with a gate driver clocks, in accordance with an embodiment.

FIG. 16 illustrates the capacitive coupling 154 of the touch electrode 86, the cathode electrode 78, and the gate driver clocks 68, 70, 122, and 152. Specifically, this coupling 154 is similar to the coupling 124 shown in FIG. 13 except that an additional coupling 156 exists in the coupling 154 due to the additional gate driver clock 152.

Figure 17:
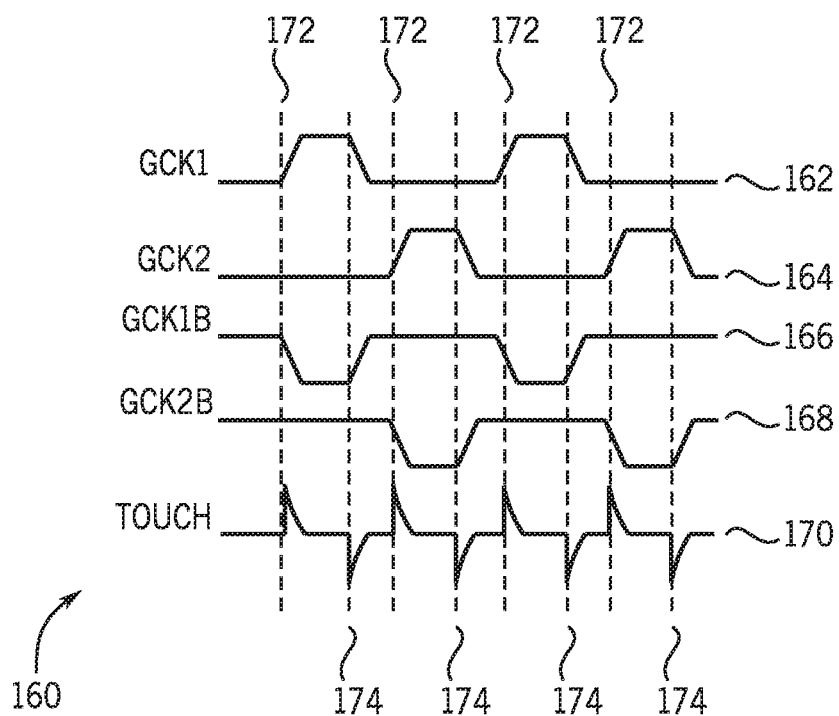
FIG. 17 is a timing diagram illustrating noise effect on the touch layer due to the gate driver clocks of FIG. 16, in accordance with an embodiment.

FIG. 17 illustrates a timing diagram 160 that is similar to the timing diagram 130 of FIG. 14. However, as noted, FIG. 17 utilizes two dummy gate driver clocks to compensate for noise generated by other gate driver clocks. The timing diagram 160 illustrates a relationship between the gate driver clocks and a touch electrode voltage utilizing voltage fluctuation compensation. The timing diagram 160 illustrates a signal 162 indicative of the voltage at the gate driver clock 68 (GCK1) and a signal 164 indicative of the voltage at the gate driver clock 70 (GCK2). The timing diagram 130 also illustrates a signal 166 indicative of the voltage at the dummy gate driver clock 122 (GCK1B), a signal 168 indicative of the voltage at the dummy gate driver clock 152 (GCK2B), and a signal 170 indicative of a touch electrode voltage. In the illustrated timing diagram 160, no actual touch has occurred, but the signal 170 increases upwardly with each rising edge 172 of the of GCK1 162 and GCK 2 164. However, this increase is relatively lower than the spike in the timing diagram 100 of FIG. 10 due to the inclusion of the dummy gate driver clocks 122 and 152 applying voltages of GCK1B and GCK2B. Moreover, decreases in the signal 170 with each falling edge 174 of the GCK1 162 and GCK2 264 are also relatively lower due to inverse application of voltages on the GCK1B and GCK2B. This reduced magnitude of fluctuation on the touch electrode may reduce the likelihood of a false positive of a touch event. In some embodiments, the fluctuations may be reduced entirely. Although each of the foregoing clocks have been discussed generically as GCKs (e.g., scan clocks), in some embodiments, at least one of each gate clocks GCK may be an emission clock (EMGCK).

It is worth noting that using a dedicated compensating dummy gate driver clock for each gate driver clock may simplify driving of the dummy gate driver clocks and/or assure that all gate driver clocks can be compensated for. However, using dedicated dummy gate driver clocks to compensate for each gate driver clock may use more space and/or complicate routing on the display. Thus, these two embodiments may be balanced based on design needs. Furthermore, these embodiments may be combined to include some dummy gate driver clocks driving compensating for two or more gate driver clocks while one or more dummy gate driver clocks compensate for one specific gate driver clock.

Figure 18:
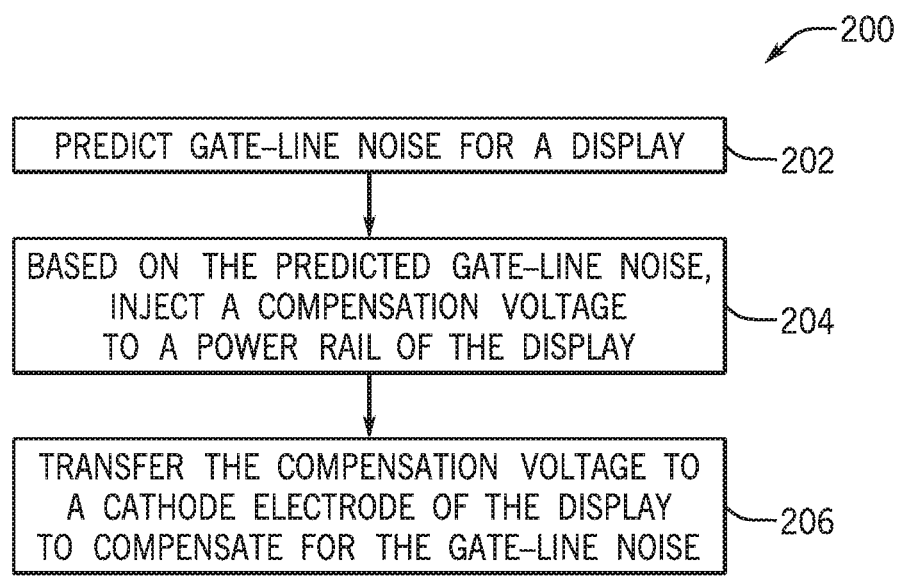
FIG. 18 is a flow diagram of a process to at least partially cancel noise in a cathode electrode via a power rail of the display of FIG. 1, in accordance with an embodiment.

Gate-line noise may be highly predictable based on device characteristics rather than dependent on image data. Gate-line noise may also be constant during an entire lifetime of the display. Thus, counter-phase noise may be injected directly into the cathode electrode 78. FIG. 18 is a flow diagram of a process 200 that may be used to at least partially cancel noise in the display 18. The process 200 includes predicting gate-line noise for the display 18 (block 202). For instance, as discussed below, an inverse noise-generation block may receive GCKs and EMGCKS that enables prediction of noise based on the clocks. In some embodiments, a calibration may be performed during manufacture of the display 18 (or batches of the displays) to determine how much each clock edge changes a voltage on the cathode electrode 78. Based on the predicted gate-line noise, the inverse noise-generation block may inject a compensation voltage to a power rail of the display 18 (block 204). For example, the power rail may include an ELVSS power rail. The power rail of the display then transfers the compensation voltage to the cathode electrode 78 to compensate for the gate-line noise on the cathode electrode 78 (block 206). For example, the ELVSS power rail may couple to the cathode electrode 78 using a ring connector that loops around an active area of the display 18.

Figure 19:
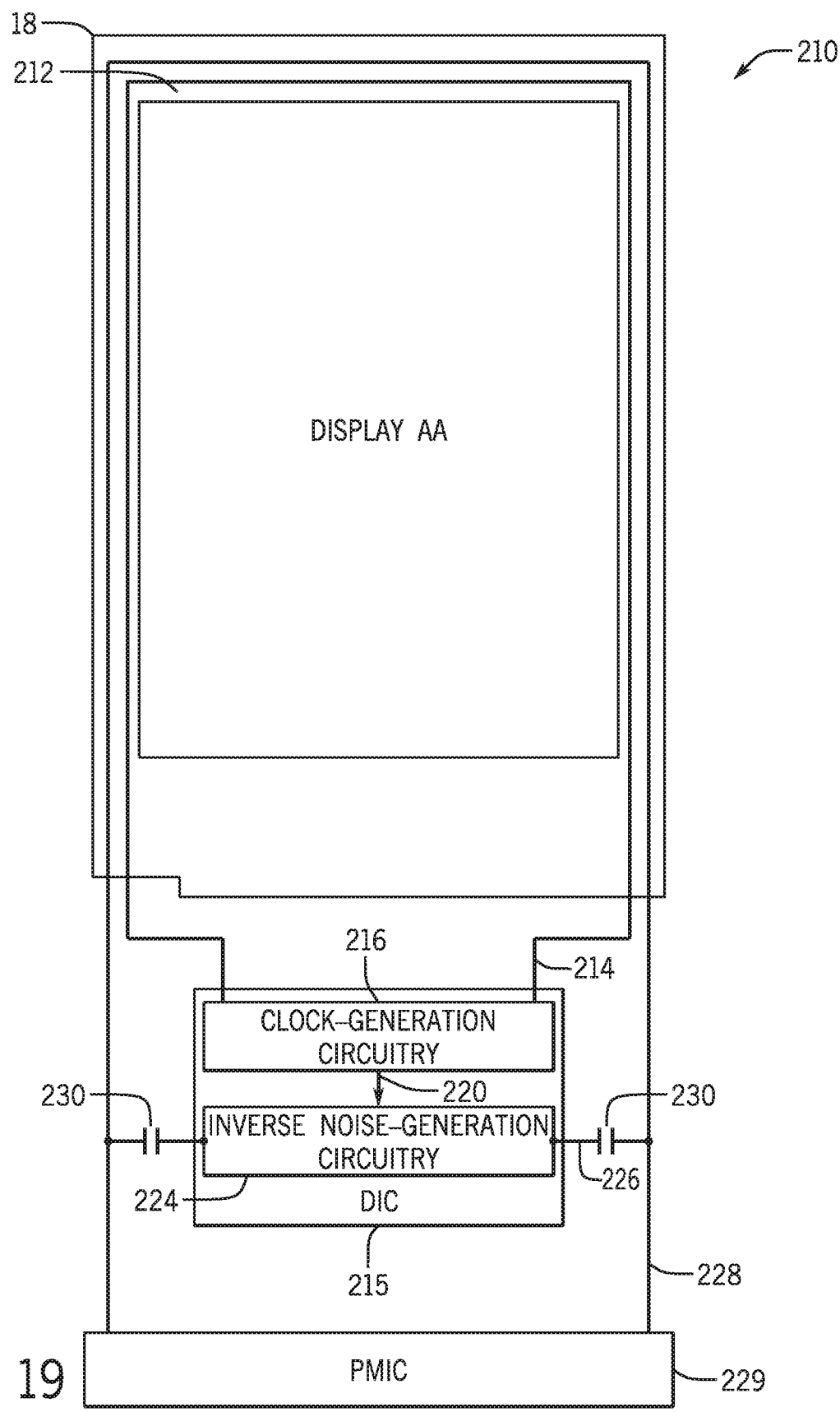
FIG. 19 is a block diagram of the display of FIG. 1 used to cancel noise in the cathode electrode via a power rail of the display of FIG. 1, in accordance with an embodiment.

For instance, FIG. 19 is a block diagram 210 of an embodiment of the display 18 including an active area 212 that has a clock bus 214 provided from a driver integrated circuit (DIC) 215 to provide the GCKs and EMGCKs to the pixels of the active area 212. For instance, the DIC 215 may include clock-generation circuitry 216 that outputs the clock bus 214. The clock-generation circuitry 216 also outputs an indication 220 of the clock bus 214 to inverse noise-generation circuitry 224. The inverse noise-generation circuitry 224 may include stored data (e.g., gathered empirically during a calibration operation) indicating what noise is generated due gate switching of the GCKs and/or EMGCKs. Using the stored data, the inverse noise-generation circuitry 224 predicts the noise based at least in part on the indication 220. The inverse noise-generation circuitry 224 the outputs a compensation voltage 226 that is an inversion of the predicted noise to a power rail 228. For instance, the power rail 228 may include an ELVSS power rail that passes around a circumference of the active area 212. The ELVSS power rail passes around the display to utilize low resistance metal ring that is low resistance relative to the conductive materials in the active area 212 that allow light to pass through the active area 212. The power level of the power rail 228 may be provided from a power management integrated circuit (PMIC) 229 of the electronic device 10. In some embodiments, the compensation voltage 226 may be supplied to other directions other than directly to the power rail 228 via capacitors 230. For instance, in some embodiments, the compensation voltage 226 may be supplied to the power rail 228 from the inverse noise-generation circuitry 224 via the PMIC 229 rather than directly to the power rail 228 via capacitors 230.

Figure 20:
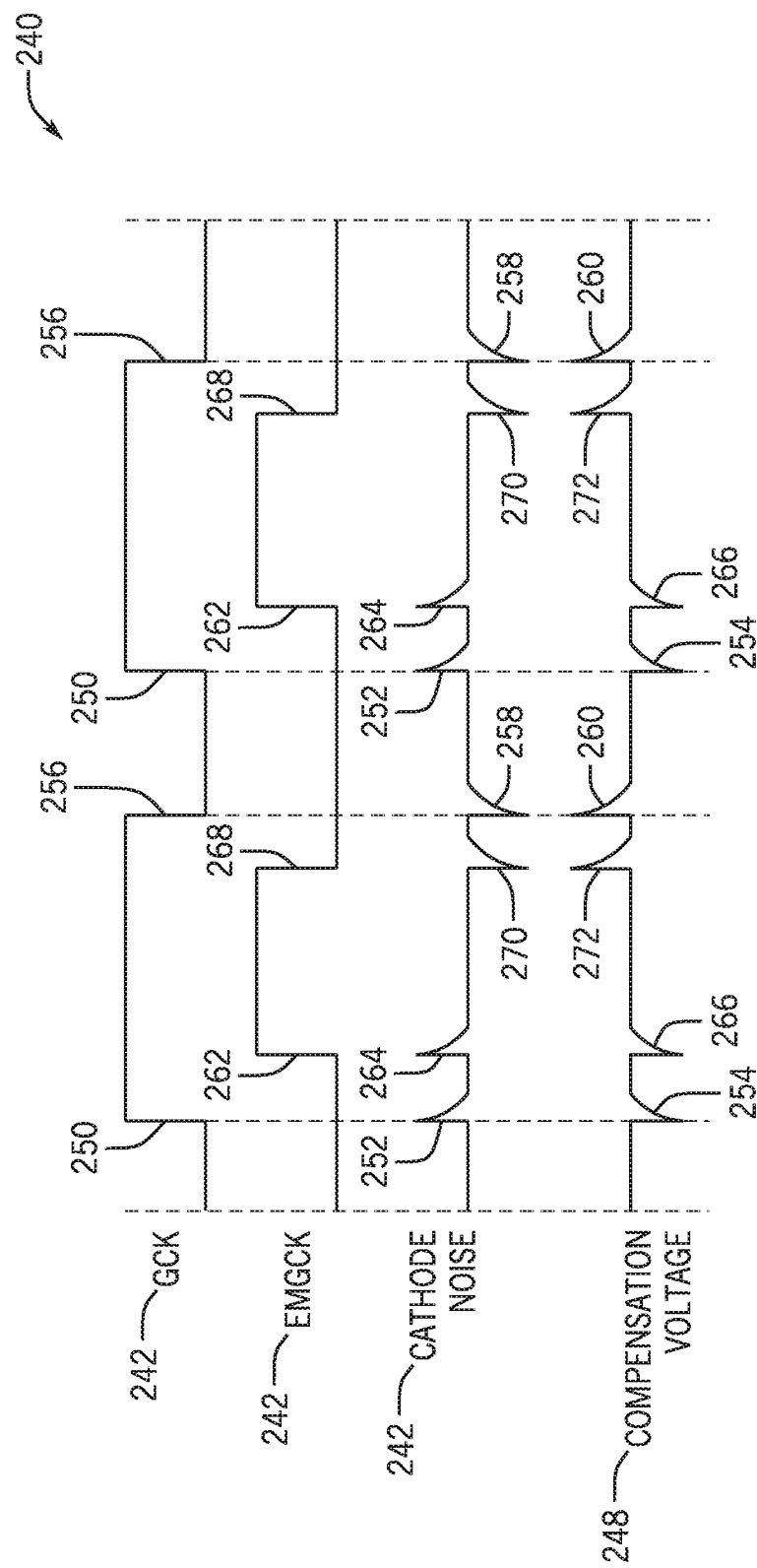
FIG. 20 is a graph of signals utilized in noise cancellation using a compensation voltage, in accordance with an embodiment.

FIG. 20 is a graph 240 of signals utilized in the embodiment of the display 18 illustrated in FIG. 19. Specifically, the graph 240 illustrates a GCK 242, an EMGCK 244, a cathode noise 246, and a compensation voltage 248. The GCK 242 and the EMGCK 244 illustrate clock signals used for scan gate clocking and emission gate clocking. The cathode noise 246 illustrates noise on the cathode electrode 78 resulting from the clock signals, and the compensation voltage 248 may be a representation of the compensation voltage 226 from the inverse noise-generation circuitry 224.

For instance, when the GCK 242 transitions high 250, corresponding up-spikes 252 occur on the cathode noise 246. Since the up-spikes 252 are predictable (and repeatable), the inverse noise-generation circuitry 224 may generate inverted spikes 254 in the compensation voltage 248 to compensate for the up-spikes 252. Similarly, when the GCK 242 transitions low 256, corresponding down-spikes 258 occur on the cathode noise 246. Since the down-spikes 258 are predictable (and repeatable), the inverse noise-generation circuitry 224 may generate inverted spikes 260 in the compensation voltage 248 to compensate for the down-spikes 258. The EMGCK 244 may cause similar fluctuations. Specifically, when the EMGCK 244 transitions high 262, corresponding up-spikes 264 occur on the cathode noise 246. Since the up-spikes 264 are predictable (and repeatable), the inverse noise-generation circuitry 224 may generate inverted spikes 266 in the compensation voltage 248 to compensate for the up-spikes 264. Furthermore, when the EMGCK 244 transitions low 268, corresponding down-spikes 270 occur as cathode noise 246. Since the down-spikes 270 is predictable (and repeatable), the inverse noise-generation circuitry 224 may generate inverted spikes 272 in the compensation voltage 248 to compensate for the down-spikes 270.

Figure 21:
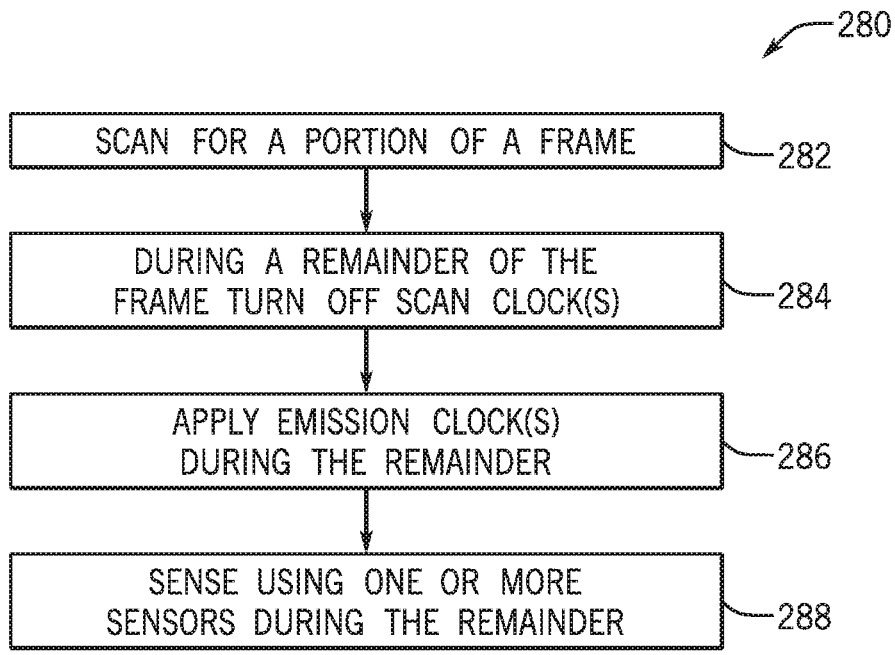
FIG. 21 is a flow diagram of a process used to reduce noise in the display of FIG. 1 by disabling gate clocks during a portion of an image frame, in accordance with an embodiment.

In addition to or alternative to injecting the compensation voltage 226, one or more clocks may be turned off during a blanking period of the display 18 to reduce noise on the cathode electrode 78. FIG. 21 is a flow diagram of a process 280 used in the display 18. The display 18 scans in image data into pixels of the active area 212 during a portion (e.g., scanning image) of a frame using scan clocks, GCKs (block 282). During a remainder (e.g., blanking portion) of the frame, the display 18 (e.g., via a timing controller of the display 18 and/or using the processor(s) 12) disables the GCKs (block 284). In some embodiments, the remainder may be hundreds of microseconds to several milliseconds. The GCKs may be disabled since scanning is not performed during the remainder. However, the display still applies the emission clocks, EMGCKs, during the remainder (block 286). For instance, the EMGCKs may be used during the remainder to keep the pixels of the active area 212 from emitting. Thus, even though the EMGCKs are applied during the remainder, the GCKs are not applied during the remainder. Therefore, the remainder experiences less/less frequent noise due to the absence of switching of the GCKs. During this remainder, the display 18 may sense using one or more sensors (block 288). For example, the one or more sensors may include touch sensing, force sensors, and the like.

Figure 22:
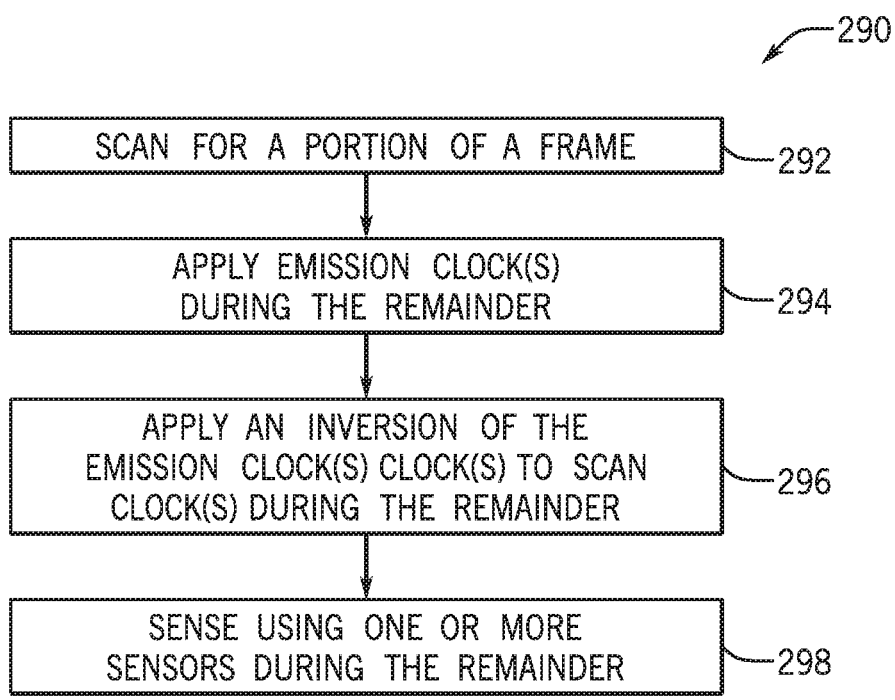
FIG. 22 is a is a flow diagram of a process used to reduce noise in the display of FIG. 1 by using gate clocks to offset emission clocks during a portion of an image frame, in accordance with an embodiment.

Since the EMGCKs clock toggle during the remainder and the GCKs are not used, one or more GCKs may be used to compensate for EMGCK switching during a blanking period of the display 18. FIG. 22 is a process 290 for utilizing one or more GCKs to compensate for EMGCK switching during a remainder of the frame. The display 18 scans in image data into pixels of the active area 212 during a portion (e.g., scanning image) of a frame using the GCKs (block 292).

During the remainder of the frame, the display 18 (e.g., via the timing controller of the display 18 and/or using the processor(s) 12) applies the EMGCKs (block 294). For instance, the display 18 may apply the EMGCKs during the remainder to ensure that the display 18 emits during the remainder. Since switching of the EMGCK(s) causes noise on the cathode electrode 78 and the GCK(s) are not used during the remainder of the frame, the display 18 may apply an inversion of the EMGCK(s) to the GCK(s) to offset the noise generated by the GCKs on the cathode electrode 78 (block 296). Due to the GCK(s) cancelling the noise on the cathode electrode 78 from switching of the EMGCKs, the remainder experiences less/less frequent noise. During this remainder, the display 18 may sense using one or more sensors (block 298).

Figure 23A:
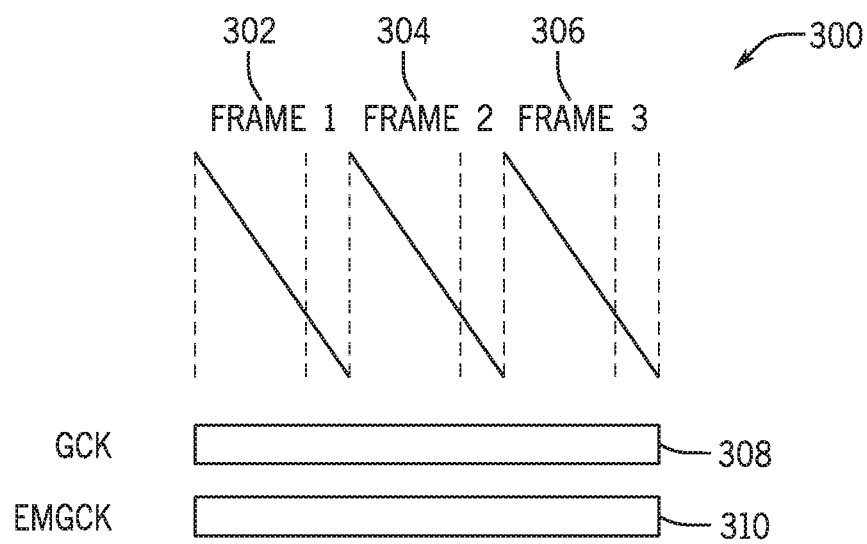
FIG. 23A is a simplified view of a scanning scheme where gate clocks cause the display of FIG. 1 to scan each image frame over an entire duration of the image frames with no gap between scanning of image frames, in accordance with an embodiment.
Figure 23B:
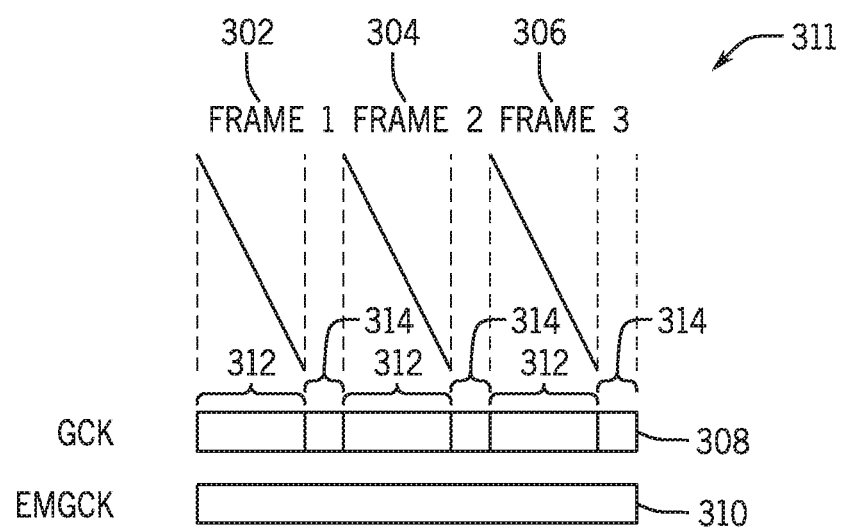
FIG. 23B is a simplified view of a scanning scheme where gate clocks cause the display of FIG. 1 to scan each image frame with a pause between image frames, in accordance with an embodiment.

FIG. 23A illustrates a simplified view of the a scanning scheme 300 where frames 302, 304, and 306 have GCKs 308 and EMGCKs 310 running throughout each frame 302, 304, and 306. FIG. 23B illustrates a simplified view of a scanning scheme 311 that scans faster using only a portion 312 (e.g., scanning period) of each frame 302, 304, and 306 to scan. During a remainder 314 (e.g., a blanking period), the display 18 may turn off the GCKs 308 or apply an inverse of the EMGCKs 310 to the GCKs 308, as previously discussed.

Figure 24:
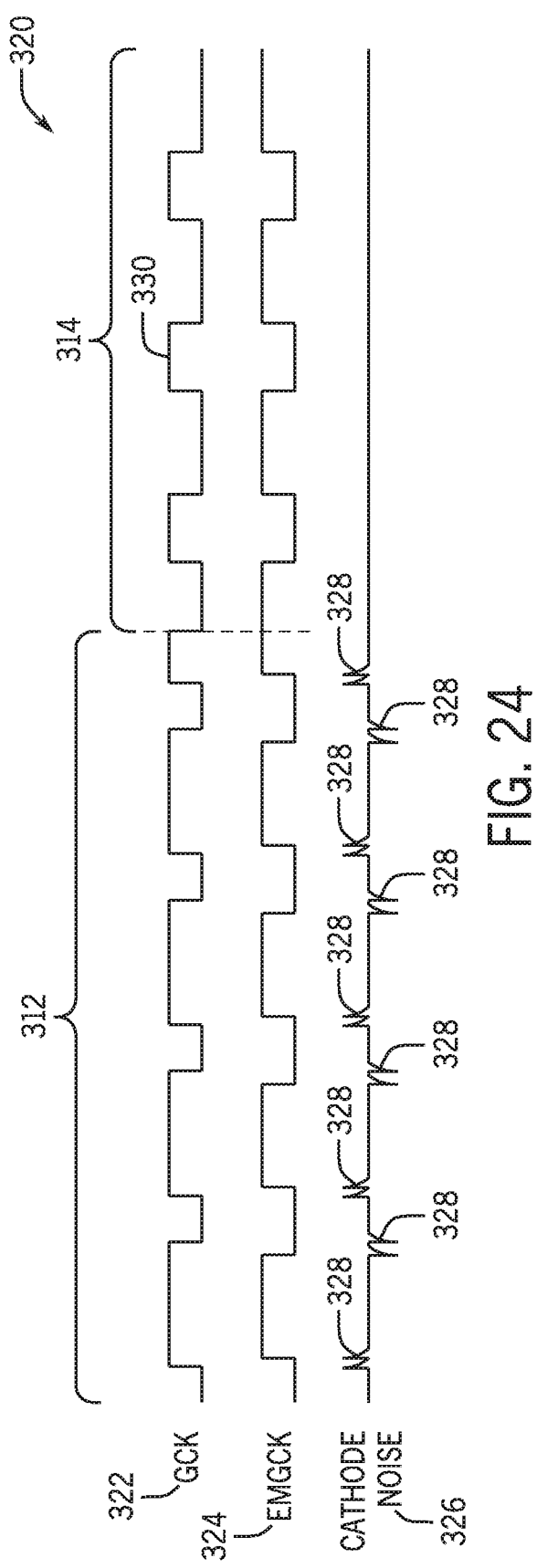
FIG. 24 is a graph illustrating noise cancellation using the application of the gate clocks as an inversion of the emission clocks, at which point a sensor may be used with reduced noise, in accordance with an embodiment.

FIG. 24 illustrates a graph 320 including a GCK 322, a corresponding EMGCK 324, and cathode noise 326 reflecting noise on the cathode electrode 78 due to the GCK 322 and the EMGCK 324. Furthermore, although the illustrated graph 320 only includes a single GCK 322 and a single EMGCK 324, other embodiments may include any number of GCKs and EMGCK. In some embodiments, each GCK may correspond to an EMGCK. Additionally or alternatively, the display 18 may drive all available GCKs inverse of the EMGCKs. As illustrated, during the portion 312 transitions of the GCK 322 and the EMGCK 324 cause switching-noise spikes 328 in the cathode noise 326. However, during the remainder 314, the GCK 322 is applied as an inversion 330 of the EMGCK 324 that reduces and/or eliminates the switching-noise spikes 328 from the cathode noise 326. In other words, counter noise is injected into the cathode electrode 78 via the GCK 322 during the remainder 314 to at least partially cancel noise on the cathode electrode 78 from the EMGCK 324 switching.

Figure 25:
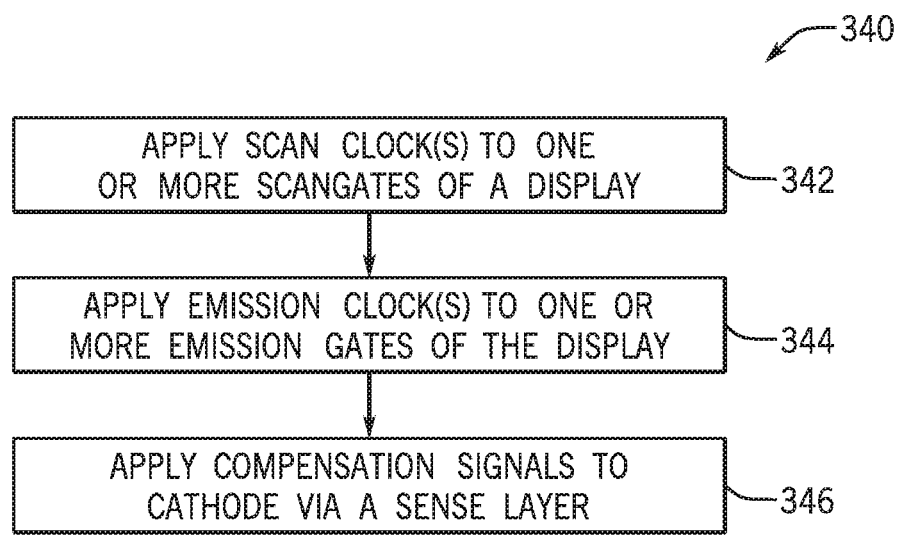
FIG. 25 is a flow diagram of a process used to cancel noise in the display of FIG. 1 by applying compensation signals to a sensing layer of the display, in accordance with an embodiment.

In some embodiments, the compensation voltage 226 may be applied to a sensing layer of the display 18 to be propagated to the cathode electrode 78. FIG. 25 is a flow diagram of a process 340 used to reduce gate-line noise on the cathode electrode 78. The display 18 applies scan clock(s) to one or more scan gates of the display 18 (block 342). The display 18 also applies emission clock(s) to one or more emission gates of the display 18 (block 344). The display 18 also applies compensation signals to the cathode electrode 78 via a sensing layer (block 346).

Figure 26:
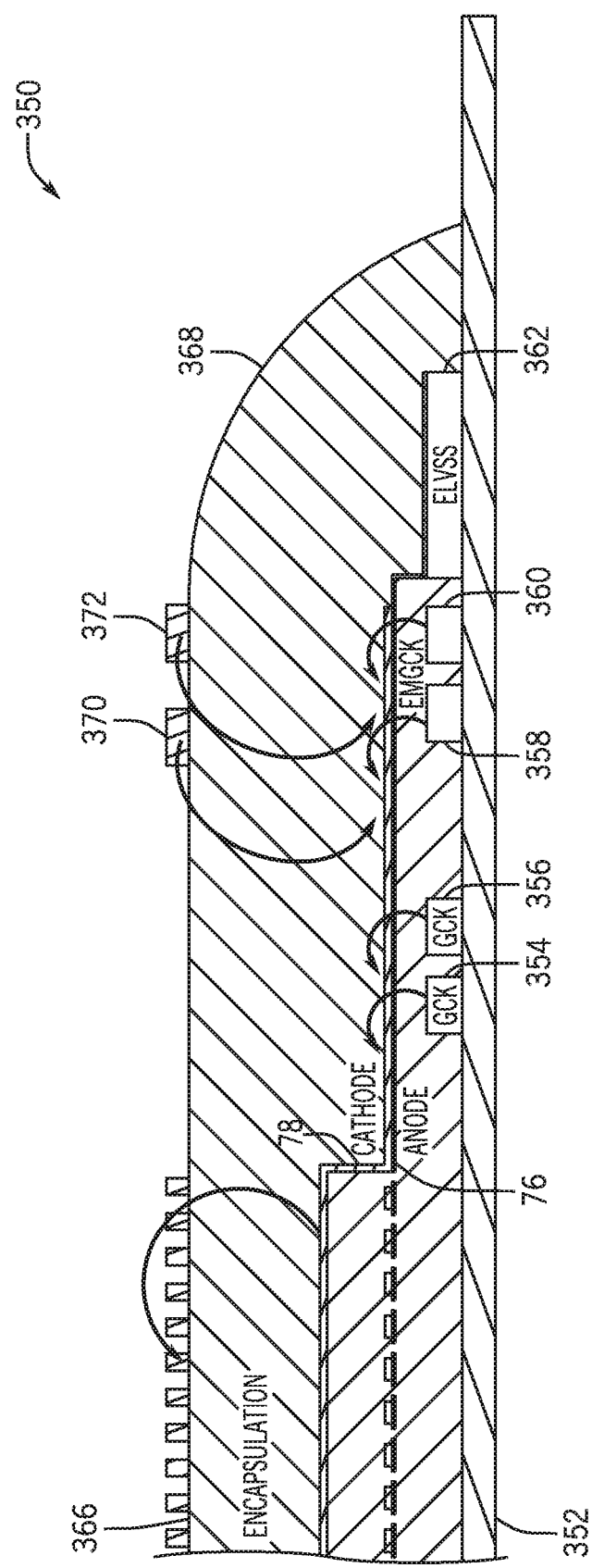
FIG. 26 is a cross-sectional diagram of a display utilizing additional traces in a sensing layer to inject compensation signals, in accordance with an embodiment.

FIG. 26 is a cross-sectional view of an embodiment of a portion 350 of the display 18.

The portion 350 includes a substrate 352 upon which pixel circuitry is mounted within the active area 212 of the display 18. For example, the pixel circuitry may include thin-film transistors (TFTs). The pixel circuitry is driven using gate clocks (GCKs) 354 and 356 to control scanning of data into the pixel circuitry. Emission of the pixel circuitry is driven using emission clocks (EMGCKs) 358 and 360. In some embodiments, the portion 350 may include various other layers, such as planarization layers, insulative layers, adhesives, and polarization layers. The anode electrode 76 and the cathode electrode 78 (e.g., coupled to ELVSS power rail 362) may be used to carry current in and out of the active area for display and/or touch functionality. The portion 350 also includes a sensing layer 366 (e.g., touch layer, force sensing layer, etc.) on top of an encapsulation layer 368. For example, a touch layer may be printed directly on the encapsulation.

However, the voltage of the sensing layer 366 may fluctuate without an action to be senses occurring on the display. Instead, as previously noted, the voltage may fluctuate due to voltage changes at the cathode electrode 78 due to switching of the GCK 354, the GCK 356, the EMGCK 358, or the EMGCK 360. Since the noise on the cathode electrode 78 is predictable and corresponding to the transitions of the GCK 354, the GCK 356, the EMGCK 358, or the EMGCK 360 and the sensing layer may capacitively couple to the cathode electrode 78, the sensing layer 366 may include additional traces 370 and 372 that enable the display to inject compensation signals as counter noise to reduce/eliminate the noise on the cathode electrode 78 due to the GCK 354, the GCK 356, the EMGCK 358, or the EMGCK 360. Although the portion 350 illustrates two traces 370 and 372 on the sensing layer and four clocks (two gate clocks and two emission clocks), the teachings of this disclosure may be applicable to any number of traces and clocks.

Figure 27:
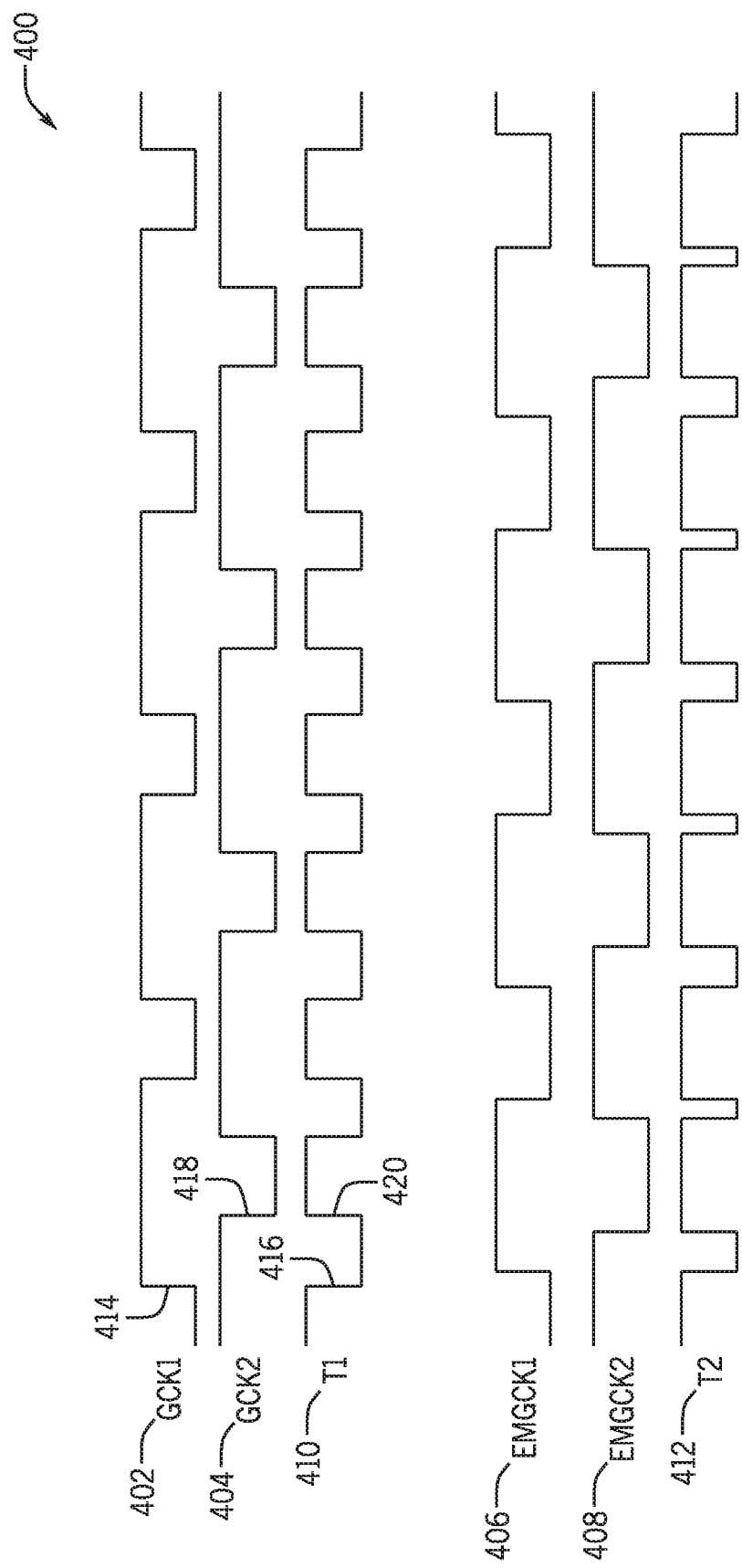
FIG. 27 is a graph of timing of the compensation signals of FIG. 26, in accordance with an embodiment.

FIG. 27 is a graph 400 illustrate timing of signals to reduce/eliminate those on the cathode electrode 78 due to GCK 354, GCK 356, EMGCK 358, or the EMGCK 360. The graph 400 includes a GCK1 402 that corresponds to the GCK 354, a GCK2 404 that corresponds to the GCK 356, an EMGCK1 406 that corresponds to the EMGCK 358, and an EMGCK2 408 that corresponds to the EMGCK 360. The graph also illustrates compensation signals T1 410 and T2 412 that are applied at traces 370 and 372, respectively. As illustrated, the compensation signal T1 410 may be generated by the inverse noise-generation circuitry 224 as a signal that makes an opposite transition for each of the transitions of the GCK1 402 and the GCK2 404. For example, when the GCK1 402 transitions high at transition 414, the compensation signal T1 410 includes a corresponding transition 416 that transitions low. Similarly, when the GCK2 404 transitions low at transition 418, the compensation signal T1 410 includes a corresponding transition 420 that transitions high. Similar to the compensation signal T1 410, the compensation signal T2 412 may be used to cancel noise on the cathode electrode 78 due to the EMGCK1 406 and the EMGCK2 408.

Although the foregoing discusses touch sensing, some embodiments may be applied to any sensor/sensing layer of any sensing type, such as force sensors.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for driving a display comprising:
predicting a gate-line noise on a cathode electrode of a display based on one or more clocks of the display; and
based at least in part on the predicted gate-line noise, injecting a compensation voltage to the cathode electrode of the display, wherein the compensation voltage at least partially cancels out the gate-line noise.

2. The method of claim 1, wherein predicting the gate-line noise is based at least in part on a clock signal of the one or more clocks.

3. The method of claim 2, wherein predicting the gate-line noise is based at least in part on stored data that predicts the gate-line noise based on the clock signal.

4. The method of claim 3, wherein the stored data is populated during a calibration mode of the display.

5. The method of claim 4, wherein the calibration mode occurs during manufacture of the display.

6. The method of claim 1, wherein injecting the compensation voltage comprises injecting the cathode electrode via a power rail.

7. The method of claim 6, wherein the power rail comprises an ELVSS source for the display.

8. The method of claim 1, wherein injecting the compensation voltage to cathode electrode comprising injecting the compensation voltage to the cathode electrode via a sensing layer of the display.

9. The method of claim 8, wherein injecting the compensation voltage to the cathode electrode via the sensing layer comprises injecting the compensation voltage via a trace in the sensing layer that is additional to sensing traces used to perform sensing via the sensing layer.

10. The method of claim 9, wherein injecting the compensation voltage to the cathode electrode via the sensing layer comprises injecting the compensation voltage to the cathode electrode via a touch electrode configured to sense a touch of the display.

11. An electronic display comprising:
a cathode electrode;
an active area comprising a plurality of pixels that are each configured to output an image based at least in part on a cathode voltage of the cathode electrode;
clock-generation circuitry configured to generate clocks to control scanning and emission; and
inverse noise-generation circuitry configured to:
receive an indication of at least one of the clocks;
generate a compensation voltage to at least partially offset noise on the cathode electrode attributable to transitions of the clocks, wherein the compensation voltage is an inversion of the at least one of the generated clocks; and
inject the compensation voltage into the cathode electrode.

12. The electronic display of claim 11 comprising a power rail, wherein injecting the compensation voltage comprises injecting the compensation voltage into the cathode electrode through the power rail.

13. The electronic display of claim 12 wherein the power rail comprises ELVSS power source.

14. The electronic display of claim 12 comprising a capacitor, wherein the inverse noise-generation circuitry is configured to inject the compensation voltage into the cathode electrode via the capacitor.

15. The electronic display of claim 12 comprising a power management integrated circuit configured to provide and manage the power rail, wherein the injecting the compensation voltage into the cathode electrode through the power rail comprises injecting the compensation voltage into the cathode electrode through the power rail via the power management integrated circuit.

16. An electronic display comprising:
a cathode electrode;
a gate clock;
an emission clock; and
an active area comprising a plurality of pixels that are each configured to output an image based at least in part on a cathode voltage of the cathode electrode, the gate clock, and the emission clock, wherein during a portion of an image frame:
the emission clock is configured to control emission of the plurality of pixels; and the gate clock is configured to scan in image data into the plurality of pixels;

and during a remainder of the image frame:
the emission clock is configured to control emission of the plurality of pixels; and
the gate clock is configured to output an inversion of the emission clock to at least partially cancel out noise on the cathode electrode attributable the emission clock during the remainder.

17. The electronic display of claim 16 comprising a sensing layer configured to sense one or more parameters during the remainder.

18. The electronic display of claim 17, wherein the sensing layer comprises a touch layer, and the one or more parameters comprises a touch of the electronic display.

19. The electronic display of claim 18, wherein the touch layer comprises a touch electrode.

20. The electronic display of claim 17 comprising a front screen of the electronic display, wherein the sensing layer comprises a force sensor configured to detect an amount of force exerted on the front screen of the electronic display.

\* \* \* \* \*